United States Patent
Diab et al.

(10) Patent No.: US 9,014,017 B2
(45) Date of Patent: Apr. 21, 2015

(54) METHOD AND SYSTEM FOR ASSOCIATING PHYSICAL LINK PARTNERS USING A LAYER TWO MECHANISM

(75) Inventors: Wael William Diab, San Francisco, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 936 days.

(21) Appl. No.: 12/562,804

(22) Filed: Sep. 18, 2009

(65) Prior Publication Data

US 2011/0019689 A1    Jan. 27, 2011

Related U.S. Application Data

(60) Provisional application No. 61/228,437, filed on Jul. 24, 2009.

(51) Int. Cl.
*H04L 12/26* (2006.01)
*H04L 12/935* (2013.01)
*H04L 29/08* (2006.01)

(52) U.S. Cl.
CPC .............. *H04L 49/3054* (2013.01); *Y02B 60/44* (2013.01); *Y02B 60/43* (2013.01); *H04L 69/324* (2013.01)

(58) Field of Classification Search
USPC ......... 370/235, 465, 401, 355, 216, 468, 254, 370/260, 338
See application file for complete search history.

(56) References Cited

U.S. PATENT DOCUMENTS

| | | | |
|---|---|---|---|
| 6,795,450 B1 | 9/2004 | Mills et al. | |
| 6,882,634 B2 * | 4/2005 | Bagchi et al. | 370/338 |
| 7,167,441 B2 * | 1/2007 | Donoghue et al. | 370/216 |
| 7,339,887 B2 * | 3/2008 | Griswold et al. | 370/216 |
| 7,433,327 B2 * | 10/2008 | Harville et al. | 370/260 |
| 7,672,318 B2 * | 3/2010 | Halen | 370/401 |
| 7,839,872 B2 * | 11/2010 | Diab et al. | 370/401 |
| 8,046,450 B1 * | 10/2011 | Schloss et al. | 709/223 |
| 2005/0163457 A1 * | 7/2005 | Liu et al. | 385/147 |
| 2006/0034295 A1 | 2/2006 | Cherukuri et al. | |
| 2006/0050731 A1 * | 3/2006 | Thomas | 370/462 |
| 2006/0198328 A1 * | 9/2006 | Jonnala et al. | 370/282 |
| 2006/0291455 A1 * | 12/2006 | Katz et al. | 370/355 |
| 2007/0081463 A1 * | 4/2007 | Bohra et al. | 370/235 |
| 2007/0088863 A1 * | 4/2007 | Mannava et al. | 710/22 |
| 2007/0104218 A1 * | 5/2007 | Hassan et al. | 370/465 |
| 2007/0280239 A1 | 12/2007 | Lund | |
| 2008/0232290 A1 * | 9/2008 | Elzur et al. | 370/311 |
| 2009/0116404 A1 * | 5/2009 | Mahop et al. | 370/254 |
| 2009/0316722 A1 * | 12/2009 | Traeber | 370/468 |
| 2010/0241880 A1 * | 9/2010 | Wertheimer et al. | 713/310 |

* cited by examiner

*Primary Examiner* — Steven H Nguyen
(74) *Attorney, Agent, or Firm* — Duane S. Kobayashi (57) ABSTRACT

A network device and an adjacent network device may auto-negotiate for utilization of an OSI layer 2 protocol for exchanging control information. The network device may generate and/or communicate to the adjacent network device, Ethernet frames comprising the control information based on the OSI layer 2 protocol. OSI layer 2 capabilities status and/or MAC address of the adjacent network device may be received and/or stored during auto-negotiation. An Ethertype and/or LLDP Ethertype may be set within the Ethernet frames to indicate utilization of the OSI layer 2 protocol. Payload within the Ethernet frames may be populated with control information that is encapsulated in a non-standardized or standardized discovery protocol frame and/or a LLDPDU. The control information may comprise device capabilities and/or communication parameters. Subsequent Ethernet frames comprising other content may be communicated to the adjacent network device based on the control information.

8 Claims, 6 Drawing Sheets

METHOD AND SYSTEM FOR ASSOCIATING PHYSICAL LINK PARTNERS USING A LAYER TWO MECHANISM

CROSS-REFERENCE TO RELATED APPLICATIONS/INCORPORATION BY REFERENCE

This patent application makes reference to, claims priority to, and claims the benefit of U.S. Provisional Application Ser. No. 61/228,437, which was filed on Jul. 24, 2009.

This patent application makes reference to U.S. patent application Ser. No. 11/686,867, which was filed on Mar. 15, 2007.

The above referenced applications are hereby incorporated herein by reference in their entirety.

FIELD OF THE INVENTION

Certain embodiments of the invention relate to communication systems. More specifically, certain embodiments of the invention relate to associating physical link partners using a layer two mechanism.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly, more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular. As an increasing number of portable and/or handheld devices are enabled for Ethernet communications, battery life may be a concern when communicating over Ethernet networks. Accordingly, ways of reducing power consumption when communicating over electronic networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for associating physical link partners using a layer two mechanism, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for associating physical link partners using a OSI layer two mechanism. In various embodiments of the invention, a network device and/or an adjacent network device may determine utilization of an OSI layer 2 protocol for exchanging control information during auto-negotiation. The network device and the adjacent network device may be coupled via an Ethernet link. The network device may generate one or more Ethernet frames comprising the control information based on the OSI layer 2 protocol. Furthermore, the network device may communicate the generated one or more Ethernet frames to the adjacent network device based on the OSI layer 2 protocol. Information regarding the utilization of the OSI layer 2 protocol may be received and/or stored during the auto-negotiation. Moreover, a MAC address of the adjacent network device may be received and/or stored during the auto-negotiation. An Ethertype may be set within the generated one or more Ethernet frames to indicate the utilization of the OSI layer 2 protocol. The payload of the generated one or more Ethernet frames may be populated with the control information. Furthermore, the payload comprising the control information may be encapsulated in one or more of a non-standardized discovery protocol frame, a standardized discovery protocol frame and/or a link layer discovery protocol data unit. The control information may comprise device capabilities and/or communication parameters. Subsequent Ethernet frames comprising other content may be communicated to the adjacent network device based on the control information.

Figure 1:
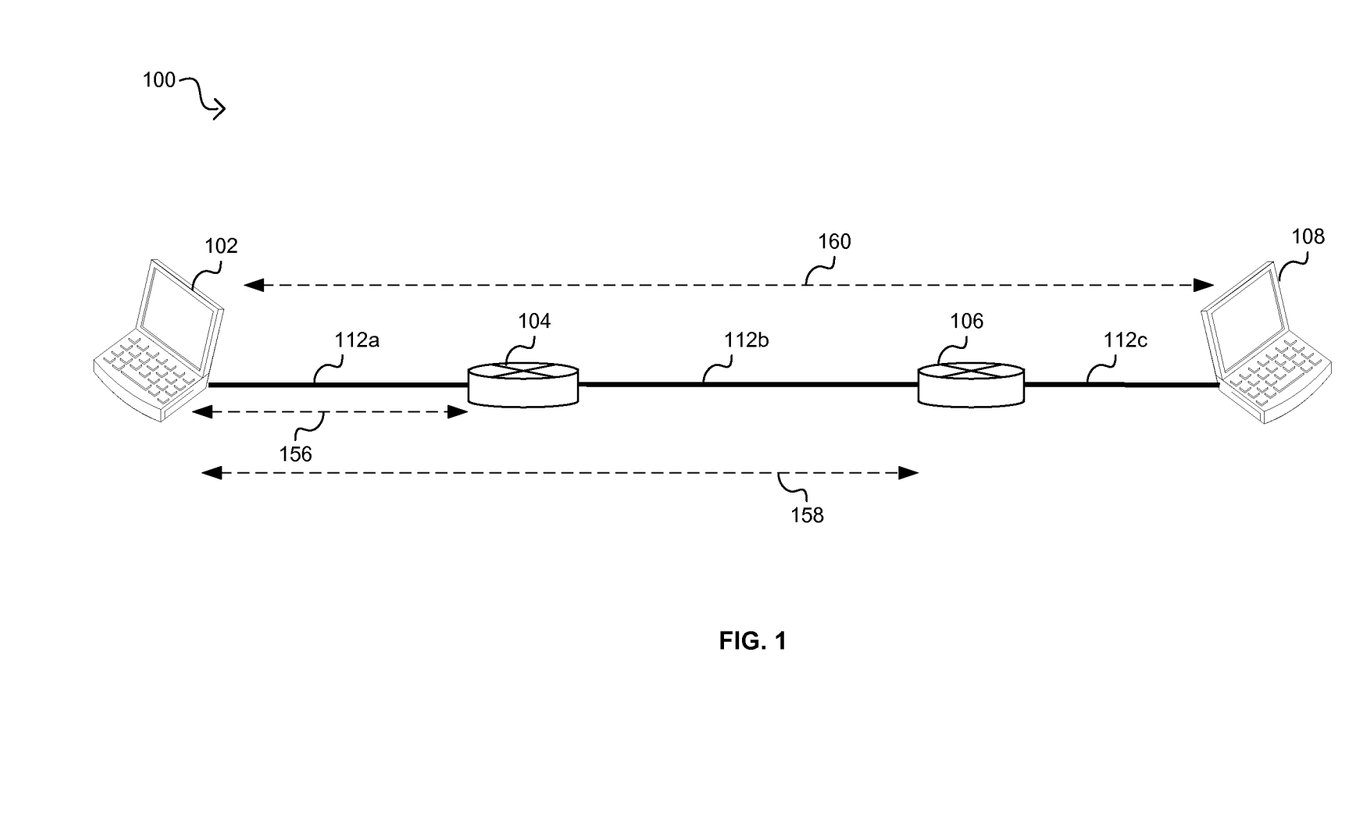
FIG. 1 is a block diagram illustrating exemplary network devices in an Ethernet network that may be operable to implement an OSI layer 2 protocol for exchanging control information, in accordance with an embodiment of the invention.

FIG. 1 is a block diagram illustrating exemplary network devices in an Ethernet network that may be operable to implement an OSI layer 2 protocol for exchanging control information, in accordance with an embodiment of the invention. Referring to FIG. 1 there is shown a network 100 comprising network devices 102, 104, 106, and 108 communicatively coupled via network links 112a, 112b and 112c, a communication path 156, a communication path 158, and a communication path 160.

The network devices 102, 104, 106, and 108 may each comprise suitable logic, circuitry, interfaces, and/or code that may be operable to communicate over a network. The network devices 102, 104, 106, and 108 may each comprise, for example, a switch, a router, a network controller, an endpoint, a computer system, audio/video (A/V) enabled equipment, or a combination thereof. A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data. Also, the network devices 102, 104, 106, and 108 may be operable to implement security protocols such as IPsec and/or MACSec.

Each of the network links 112a, 112b and/or 112c (collectively referred to herein as the network links 112) may comprise copper, wireless, optical, and/or backplane media. For example, a copper medium such as STP, Cat 3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media, single mode fiber as well as multi-mode fiber may be utilized. With regard to wireless communication, the network devices 102, 104, 106, and 108 may support one or more of the 802.11 family of protocols.

Physical link partners within the network 100 comprise adjacent network devices that are coupled via an Ethernet link. For example, the network devices 102 and 104 that are coupled via the link 112a are link partners, physical link partners and/or adjacent network devices. A communication path may span multiple network devices and may span multiple links. For example, the communication path 156 may comprise the network device 102, the link 112a and the network device 158, the communication path 158 may comprise the network device 102, the link 112a, the network device 158, the link 112b and the network device 106 and the communication path 160 may comprise the network device 102, the link 112a, the network device 158, the link 112b, the network device 106, the link 112c and the network device 108.

One or more of the network devices 102, 104, 106, and 108 may comprise suitable logic, circuitry, interfaces, and/or code that may be operable to exchange transmission parameters via OSI layer 1 auto-negotiation prior to communicating content via Ethernet packets. Furthermore, one or more of the network devices 102, 104, 106, and 108 may comprise suitable logic, circuitry, interfaces, and/or code that may be operable to advertize its identity and/or device capabilities via an OSI layer 2 discovery protocol such as link layer discovery protocol (LLDP). In various embodiments of the invention, additions and/or modifications to auto-negotiation and/or to one or more discovery protocols may enable improvements in communicating with an adjacent network device. In this regard, an OSI layer 2 protocol may enable the exchange of control information such as device capabilities and/or communication parameters to an adjacent network device. Packets may be utilized for the exchanging of the control information, for example, packets comprising LLDP frames and/or other types of discovery frames. In this regard, the packets comprising control information may also comprise a destination address specifying the adjacent network device rather than for example a multicast and/or broadcast address.

In operation, the network device 102 may initiate communication with the adjacent network device 104 via the communication path 156. The network device 102 may initiate auto-negotiation with the network device 104 and may set a unique bit to indicate that the network device 102 is operable to communicate based on OSI layer 2. The auto-negotiation may also comprise communication of an identity of the network device 102 and/or the network device 104. In addition, the auto-negotiation may comprise an indication that the OSI layer 2 protocol for exchanging device capabilities to an adjacent network device may be utilized. Auto-negotiation is further described with respect to FIG. 3. Subsequent to the auto-negotiation process, one or both of the network devices 102 and 104 may communicate control information, for example, device capabilities and/or communication parameters, within packets based on the OSI layer 2 protocol. The packets may comprise, for example, LLDP frames. In this regard, the packets may comprise a destination MAC address specified for the corresponding link partner 102 and/or 104. The MAC address may be inspected at the output of the sending network device and/or at the input of the receiving device. The modified auto-negotiation and the OSI layer 2 protocol may ensure that control information such as the device capabilities and/or communication parameters are being exchanged between the appropriate devices. In this manner, inappropriate delivery of unfiltered discovery protocol frames may be mitigated. For example, the OSI layer 2 protocol may prevent LLDP messages sent from the network device 102 to the network device 104 from being leaked to the network device 106 via the communication path 156 and/or to the network device 108 via the communication path 160.

Figure 2:
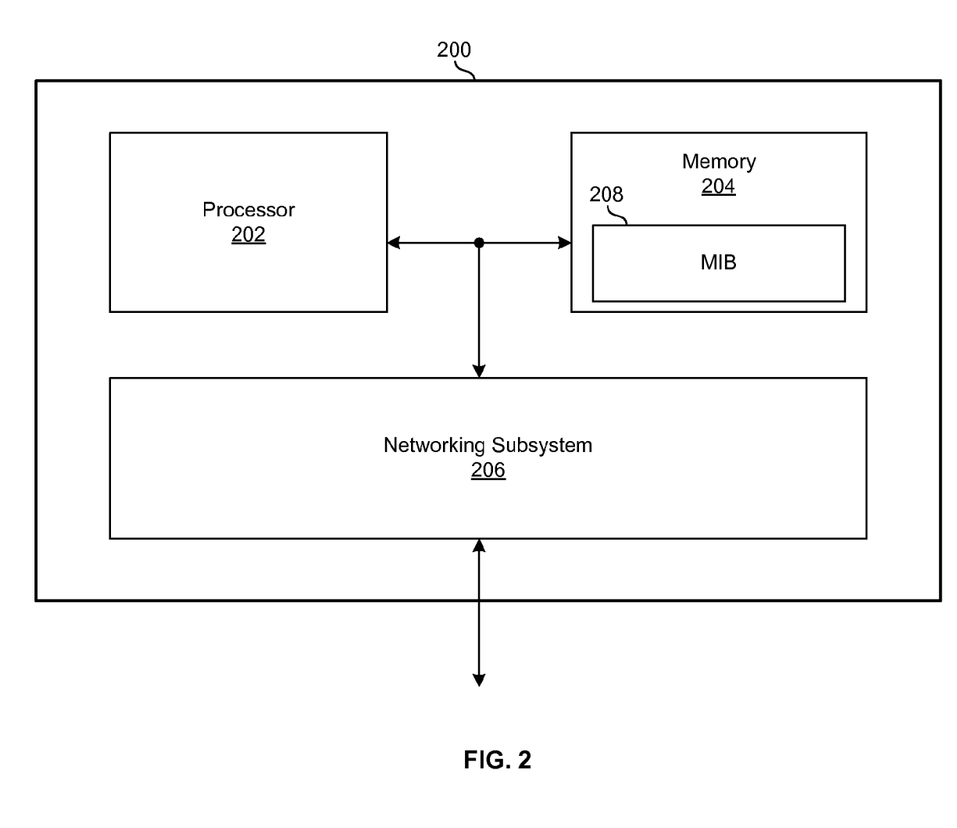
FIG. 2 is a block diagram of an exemplary network device operable to implement an OSI layer 2 protocol for exchanging control information between adjacent network devices, in accordance with an embodiment of the invention.

FIG. 2 is a block diagram of an exemplary network device operable to implement an OSI layer 2 protocol for exchanging control information between adjacent network devices, in accordance with an embodiment of the invention. Referring to FIG. 2 there is shown a network device 200 which may be similar to, or substantially the same as, one or more of the devices 102, 104, 106, and 108 described with respect to FIG. 1. The network device 200 may comprise a processor 202, a memory 204, a MIB 208, and a networking subsystem 206.

The processor 202 may comprise suitable logic, circuitry, interfaces and/or code that may be operable to process data and/or control operations of the network device 200. With regard to processing data, the processor 202 may be operable to packetize, de-packetize, transcode, reformat and/or otherwise process data received from and/or to be transmitted by the networking subsystem 206. With regard to controlling operations of the network device 200, the processor 202 may be operable to provide control signals to the various other portions of the network device 200. The processor 202 may also control data transfers between various portions of the network device 200. The processor 202 may enable execution of applications programs and/or code. In this regard, the applications, programs, and/or code may enable, for example, parsing, transcoding, or otherwise processing data. Furthermore, the applications, programs, and/or code may enable, for example, configuring or controlling operation of the networking subsystem 206, and/or the memory 204.

The memory 204 may comprise suitable logic, circuitry, interfaces and/or code that may enable storage or programming of information that includes parameters and/or code that may effectuate the operation of the network device 200. The parameters may comprise configuration data and the code may comprise operational code such as software and/or firmware, but the information need not be limited in this regard. Additionally, the parameters may include adaptive filter and/or block coefficients. The memory 204 may comprise the MIB 208 for storing address information and/or control information such as device capabilities and/or communication parameters for adjacent network devices.

The networking subsystem 206 may comprise suitable logic, circuitry, and/or code that may be operable to transmit and receive data in adherence to one or more networking standards. The networking subsystem 206 may be operable to transmit and/or receive data via, for example, a T1/E1 line, a passive optical network, DSL, a cable television infrastructure, a satellite broadband internet connection, a satellite television infrastructure, a cellular network, Bluetooth, wireless Ethernet, WiMAX, and/or wired Ethernet. The networking subsystem 206 may be operable to implement, switching, routing, and/or network interface card (NIC) functions. In this regard, the networking subsystem 206 may implement physical layer functions, data link layer functions, and may even implement functions associated with OSI layer 3 and higher OSI layers.

In operation, the network device 200 may be operable to implement an OSI layer 2 protocol for exchange of device capabilities and/or configuration parameters between adjacent network devices. In this regard, the network subsystem 206 may be operable to auto-negotiate various transmission parameters as well as obtain an identity and/or MAC address of an adjacent network device during the OSI layer 1 auto-negotiation process. The network identity and/or MAC address of the adjacent network device may be stored in the MIB 208 of the memory 204. In addition, the network device 200 may advertise its ability and/or intention to perform the OSI layer 2 protocol for exchange of control information. In this regard, the network subsystem 206 may receive notification during auto-negotiation of the link partner's ability and/or intention to utilize the OSI layer 2 protocol which may be stored in the MIB 208 of the memory 204. Furthermore, the control information may be stored in the memory 204 and may be utilized by the network device 200 during communication with an adjacent network device. Furthermore, the MAC address, OSI layer 2 protocol status and/or the control information stored within the memory 204 may be queried by another network device, for example, utilizing SNMP.

Figure 3A:
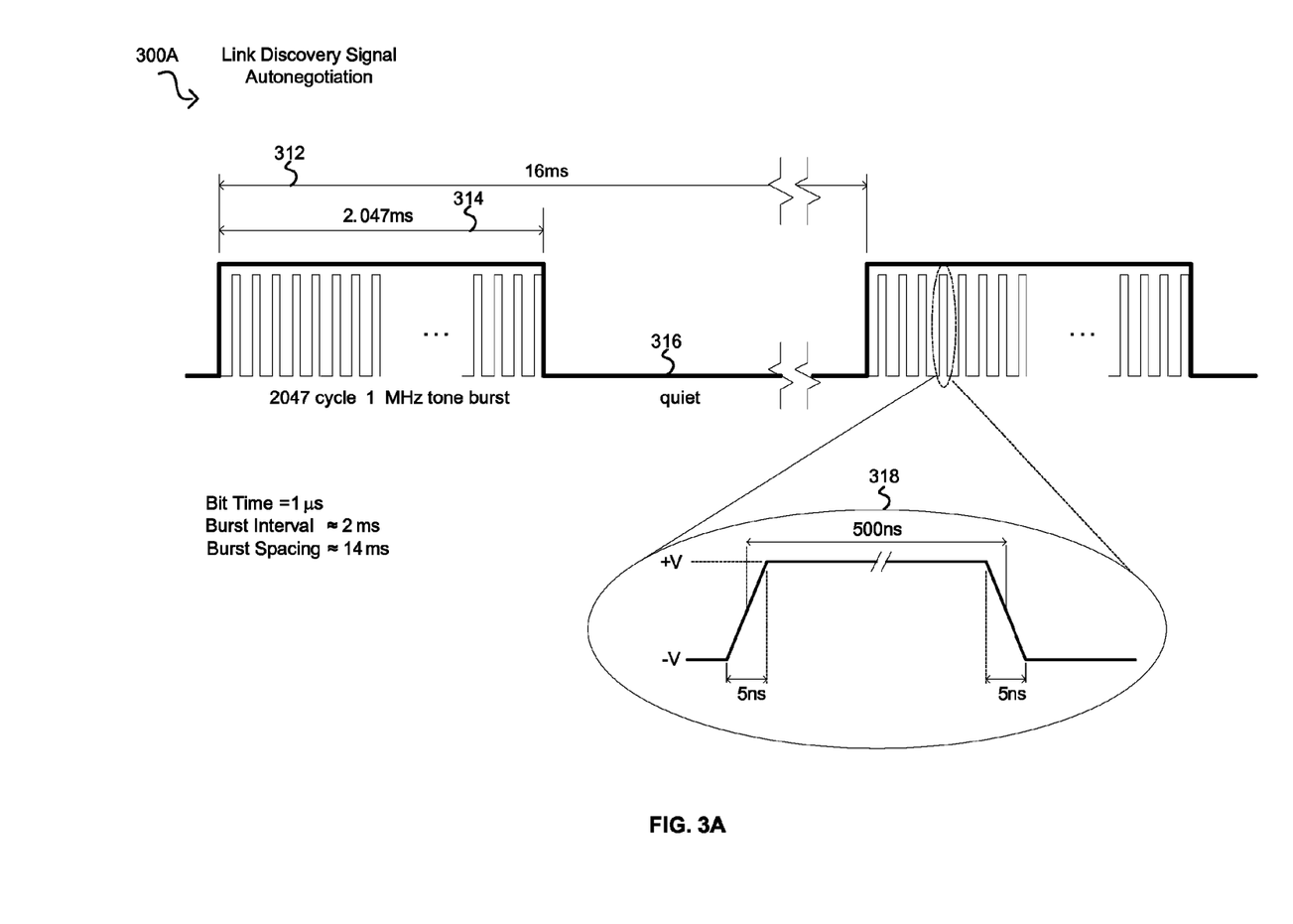
FIG. 3A is a diagram that illustrates an exemplary auto-negotiation link discovery signal (LDS) that may be utilized for advertizing a OSI layer 2 protocol for exchanging control information and/or for sharing a MAC address with an adjacent physical link partner, in accordance with an embodiment of the invention.

FIG. 3A is a diagram that illustrates an exemplary auto-negotiation link discovery signal (LDS) that may be utilized for advertizing a OSI layer 2 protocol for exchanging control information and/or for sharing a MAC address with an adjacent physical link partner, in accordance with an embodiment of the invention. Referring to FIG. 3A, there is shown an LDS signal 300A that may comprise a period 312 which may be utilized during the initial phases of the LDS scheme. Within the period 312 there may be a tone burst portion 314 and a quiet portion 316. A cycle 318 of the tone burst portion 314 is also shown for a 1 MHz square carrier signal. Notwithstanding, the invention need not be limited in this regard and other carrier frequencies and waveforms may also be utilized in accordance with any operating requirements.

The LDS signal 300A for auto-negotiation may be utilized by a pair of link partners 102 and 104, for example, to communicate supported operating modes. The LDS signal 300A may be generated by a physical layer within a network device and it may declare technical abilities of the network device to a link partner. The auto-negotiation signal 300A may be generated by a physical layer within the network device 102, for example, and it may comprise one or more logic signals that may declare technical abilities of the network device 102 to the link partner 104.

The tune burst portion 314 of the LDS signal 300A, a 1 MHz carrier, for example, may be gated or modulated by a logic signal with, for example, 12.5% duty cycle to create the approximately 2 ms tone burst portion 314, separated by approximately 14 ms of the quiet portion 316. During subsequent phases of the LDS scheme, the 1 MHz carrier may be replaced by a maximal length pseudorandom number (PN) sequence derived from an 11-bit polynomial, for example. Moreover, during the final phases of the LDS scheme, the 1 MHz carrier may then be replaced by a repeating 16-bit data pattern encoding the PHY abilities scrambled by the 11-bit maximal length PN sequence. U.S. patent application Ser. No. 11/686,867, which was filed on Mar. 15, 2007 discloses link discovery signals, and is hereby incorporated herein by reference in its entirety.

In operation, a network device, for example, one of the network devices 102, 104, 106, 108 and/or 200 may be operable to perform auto-negotiation with a link partner prior to performing communication of data packets and/or data streams between link partners. The link partners may be adjacent network devices. For example, the network device 102 and/or the network device 104 may be link partners that are operable to auto-negotiate via the link 112a. In addition, the network device 102 and/or 104 may be operable to determine transmission parameters for communication during the auto-negotiation process. In an exemplary embodiment of the invention, one or both of the link partners 102 and/or 104 may be operable to exchange one or more tone bursts such as the tone burst 314. The one or more tone bursts may indicate that a link partner is capable of communication based on OSI layer 2 communication protocols. Moreover, the one or more tone bursts may provide a MAC address of a sending network device and/or may indicate that the sending network device may be operable to exchange device capabilities and/or configuration parameters based on the OSI layer 2 protocol. For example, subsequent to auto-negotiation, packets comprising device capabilities and/or communication parameters may be exchanged between the link partners. In this manner, the network devices 102 and/or 104 may reduce the amount of information communicated during auto-negotiation by the physical layers of the network devices. Information regarding the MAC address of the link partner and information regarding use of OSI layer 2 protocol may be stored in the MIB 208 for example. Furthermore, the stored information may be utilized when exchanging Ethernet packets with the link partner that may comprise control information such as device capabilities and/or communication parameters.

Figure 3B:
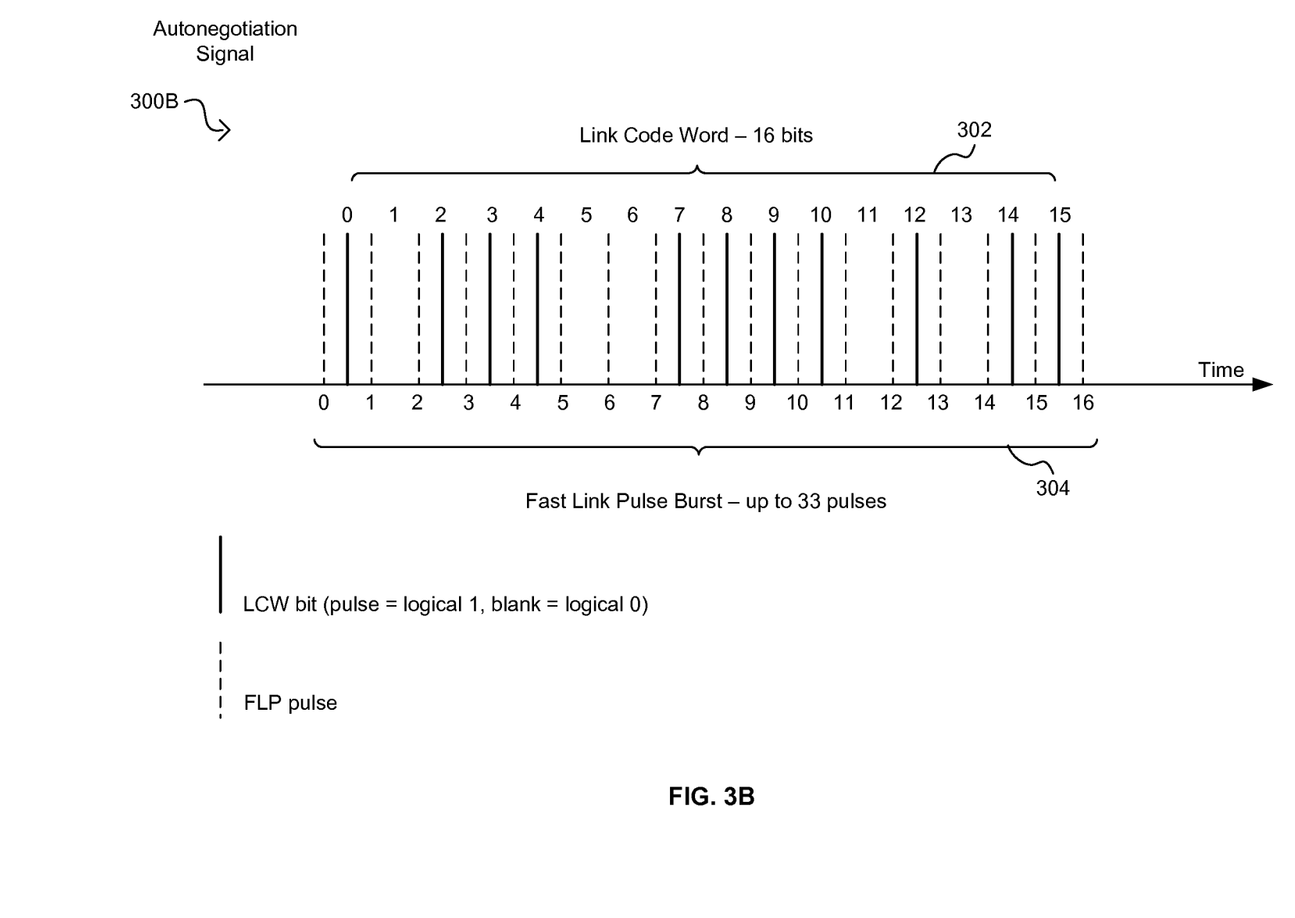
FIG. 3B is a diagram illustrating an exemplary auto-negotiation FLP burst that may be utilized for advertizing a OSI layer 2 protocol for exchanging control information and/or for sharing a MAC address with an adjacent physical link partner, in accordance with an embodiment of the invention

FIG. 3B is a diagram illustrating an exemplary auto-negotiation FLP burst that may be utilized for advertizing a OSI layer 2 protocol for exchanging control information and/or for sharing a MAC address with an adjacent physical link partner, in accordance with an embodiment of the invention. Referring to FIG. 3B, there is shown, an Ethernet auto-negotiation signal 300B comprising a fast link pulse (FLP) burst 304 and a link code word (LCW) 302.

Similar to the LDS signal 300A, the auto-negotiation signal 300B may be utilized by a pair of link partners to determine transmission parameters, for example, parameters for data rate and/or duplex and/or half duplex modes of operation. In addition, the auto-negotiation signal 300A may be generated by a physical layer within a network device and it may declare technical abilities of the network device to a link partner. The auto-negotiation signal may, for example, may comprise one or more FLP bursts such as the FLP burst 304. The one or more FLP bursts may comprise up to thirty three pulses where 16 of the pulses may comprise bits of a link code word (LCW), for example, the LCW 302. The one or more FLP bursts may comprise an LCW base page and/or one or more subsequent LCW pages.

In operation, a network device, for example, one of the network devices 102, 104, 106, 108 and/or 200 may be operable to perform auto-negotiation based on FLP bursts. For example, the network device 102 and/or the network device 104 may be operable to exchange one or more FLP bursts such as the FLP burst 304. The one or more FLP bursts may comprise an LCW such as the LCW 302. The LCW(s) may indicate to a link partner, that the sending link partner may be capable of communicating based on OSI layer 2 protocols. Furthermore, a network device may communicate its MAC address and/or may indicate that the device may be operable to exchange device capabilities and/or configuration parameters based on the OSI layer 2 protocol.

As with auto-negotiation utilizing the LDS signal 300A, subsequent to auto-negotiation utilizing the FLP burst 304, packets comprising device capabilities and/or communication parameters may be exchanged between the link partners. Information regarding the MAC address of the link partner and information regarding use of OSI layer 2 protocol may be stored in the MIB 208 for example. Furthermore, the stored information may be utilized when exchanging Ethernet packets with the link partner that may comprise control information such as device capabilities and/or communication parameters. In this manner, the network devices 102 and/or 104 may reduce the amount of information communicated during auto-negotiation by the physical layers of the network devices.

Figure 4:
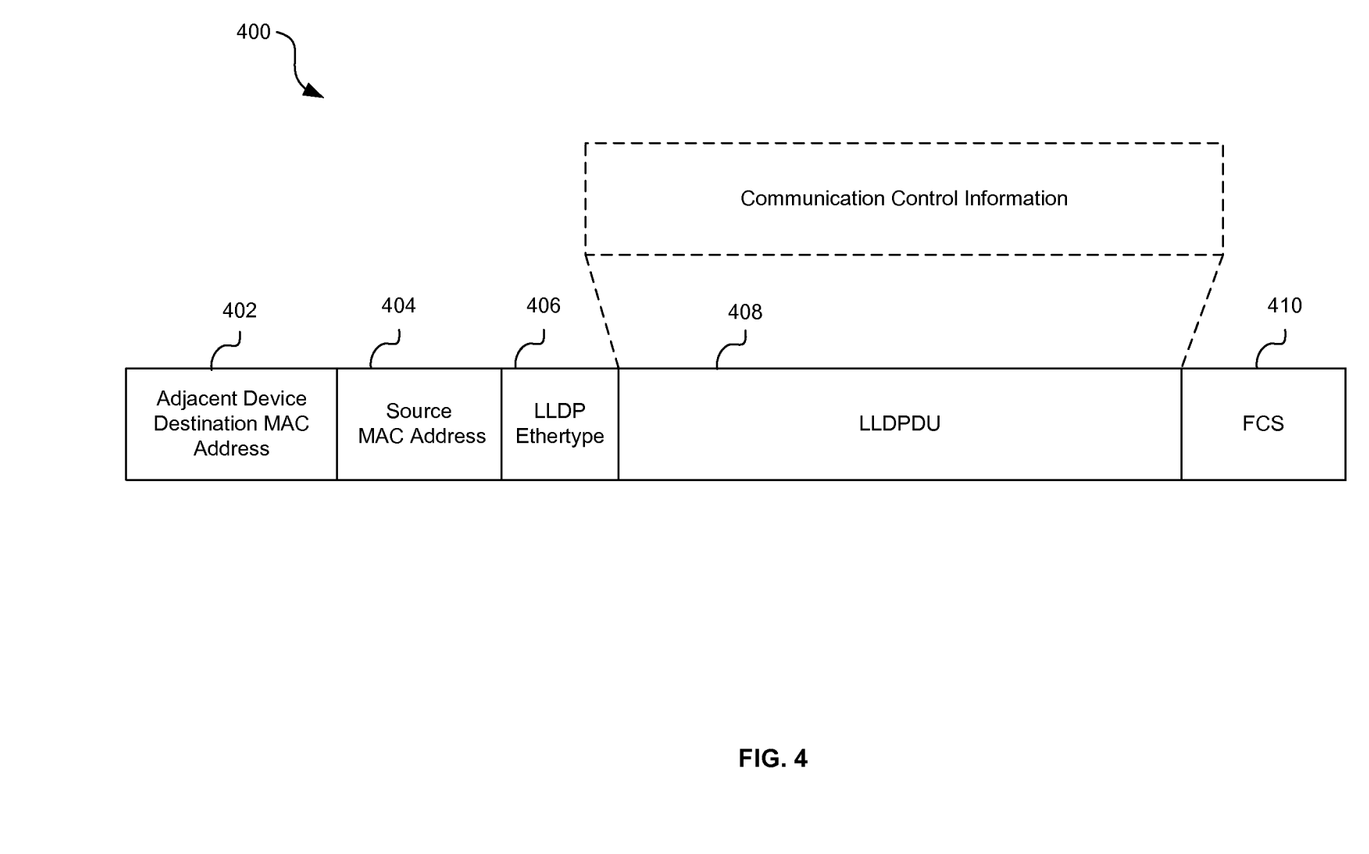
FIG. 4 illustrates an exemplary Ethernet frame that may be communicated based on an OSI layer 2 protocol for exchanging control information to an adjacent network device, in accordance with an embodiment of the invention.

FIG. 4 illustrates an exemplary Ethernet frame that may be communicated based on an OSI layer 2 protocol for exchanging control information to an adjacent network device, in accordance with an embodiment of the invention. Referring to FIG. 4, there is shown an Ethernet frame 400 comprising a destination MAC address field 402, a source MAC address field 404, a link layer discovery (LLDP) Ethertype field 406, a LLDP packet data unit (LLDPDU) 408, and a frame check sequence (FCS) 410.

The destination MAC address field 402 may comprise information that may be utilized to identify the node that the packet is to be sent to. In this regard, the destination address may correspond to an adjacent network device. The source MAC address 404 field may comprise information that may be utilized to identify the node that originated the packet.

In an exemplary embodiment of the invention, a discovery protocol, for example, a non-standardized discovery protocol or the IEEE 802.1AB link layer discovery protocol (LLDP) may be utilized to format the control information within the Ethernet frame 400. In this regard, the LLDPDU 408 may comprise control information being transmitted to the adjacent link partner. For example, the LLDPDU 408 may comprise device capabilities and/or communication parameters.

The LLDP Ethertype field 406 may be utilized to identify the type and/or nature of the LLDPDU 408. In an exemplary embodiment of the invention, a type, length and value structure within the LLDPU 408 may be defined to indicate that the LLDPDU 408 comprises one or more types of data of the OSI layer 2 protocol for exchanging control information between link partners and may comprise the control data.

In operation, a pair of link partners, for example, the link partners 102 and/or 104 may auto-negotiate transmission parameters. During the auto-negotiation process, the link partners may indicate that they are capable of communicating based on OSI layer 2 protocol. Providing this information may ensure that the pair of link partners 102 and 104 are communicating directly to each other without another device, for example a repeater switch, in between them. Also during the auto-negotiation, the link partners 101 and/or 104 may communicate MAC addresses and/or may indicate that the OSI layer 2 protocol for exchange of control information prior to communicating packet data and/or data steams may be utilized. Providing the MAC address during auto-negotiation may enable the link partners to engage services comprising link layer discovery protocol exchanges. One or both of the link partners 102 and 104 may store the information exchanged during auto-negotiation in a memory space such as the MIB 208 described with respect to, for example, FIG. 2. The information may correspond to the OSI layer 2 capability status, to the MAC address and/or to the OSI layer 2 protocol for exchange of control information. Subsequent to auto-negotiation, one or both of the link partners 102 and 104 may generate one or more Ethernet frames, for example, the Ethernet frame 400 that may be utilized to exchange the control information such as device capabilities and/or communication parameters. The destination address 402 may comprise a MAC address of the receiving link partner. The source address 404 may comprise the MAC address of the sending link partner. The LLDP Ethertype 406 may be set and the LLDPDU 408 type, length and variable fields may indicate use of the OSI layer 2 protocol for exchange of control information and/or may comprise the control information. The one or more generated Ethernet frames such as the Ethernet frame 400 may be communicated via the link 112 to the corresponding link partner 102 and/or 104.

The one or more communicated Ethernet frames such as the Ethernet frame 400 may be received by a corresponding link partner. The receiving link partner may parse the frames such as the frame 400 and may determine whether the frame utilizes OSI layer 2 protocol for exchange of control information, and if so, may determine and/or store the control information from the LLDPDU 408. After determining and/or storing the control information, the receiving link partner 102 and/or 104 may configure one or more of logic, circuitry, interfaces and/or code according to the received control information for communicating subsequent packet data and/or data streams that may comprise user content for example.

Figure 5:
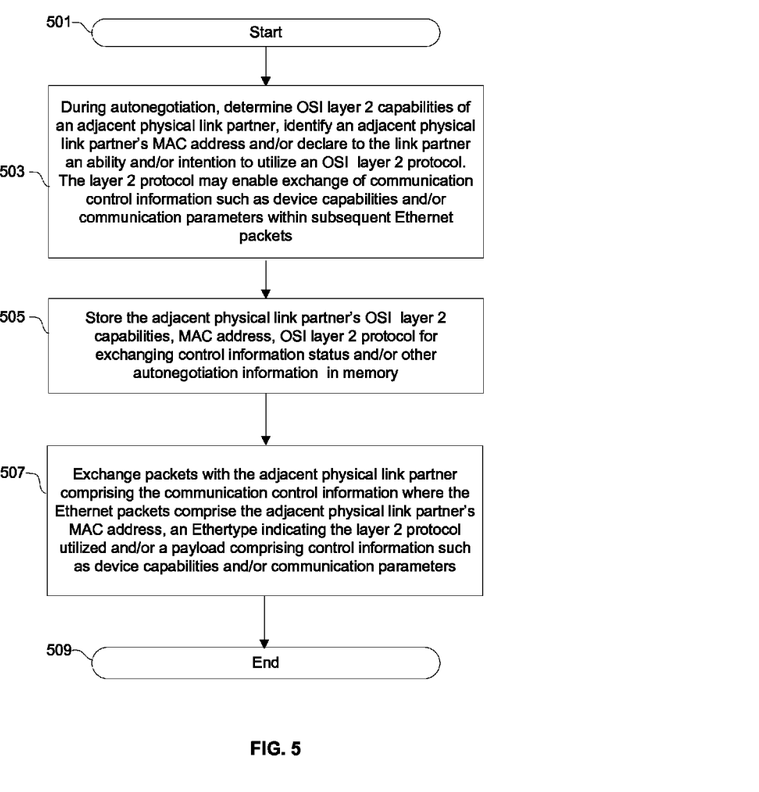
FIG. 5 is a flow chart illustrating exemplary steps for implementing an OSI layer 2 protocol for exchanging control information with an adjacent network device utilizing packets, in accordance with an embodiment of the invention.

FIG. 5 is a flow chart illustrating exemplary steps for implementing an OSI layer 2 protocol for exchanging control information with an adjacent network device utilizing packets, in accordance with an embodiment of the invention. Subsequent to start step 501, in step 503, during auto-negotiation, OSI layer 2 capabilities of an adjacent physical link partner and/or a MAC address of the adjacent physical link partner, for example, a MAC address of the network device 104, may be identified by the link partner 102 and/or vice versa. Furthermore, during auto-negotiation, an ability and/or intention to utilize an OSI layer 2 protocol for exchanging additional control information such as device capabilities and/or communication parameters may be declared by the network device 102 to the network device 104 and/or vice versa. In this regard, the communication control parameters may be communicated within subsequent Ethernet packets. In step 505, the OSI layer 2 capabilities, MAC address of the adjacent physical link partner 102 and/or 104 and/or the OSI layer 2 protocol for exchanging control information status may be stored in memory. In step 507, Ethernet packets comprising control information may be exchanged between the adjacent physical link partners 102 and/or 104. The Ethernet packets may comprise the adjacent physical link partner's MAC address, an Ethertype indicating the OSI layer 2 protocol for exchanging control information and/or a payload comprising control information such as device capabilities and/or communication parameters. For example, the payload may comprise an LLDP frame. The exemplary steps may end at end step 509.

In an embodiment of the invention, a network device 102 or 200, for example, and/or an adjacent network device 104, for example, may determine utilization of an OSI layer 2 protocol for exchanging control information during auto-negotiation, for example, utilizing a signal similar to the auto-negotiation signal 300B. The network device 102 and the adjacent network device 104 may be coupled via an Ethernet link 112a, for example. The network device 102 may generate one or more Ethernet frames, for example, similar to the Ethernet frame 400, comprising the control information based on the OSI layer 2 protocol, for example, information carried in the payload 408 and/or the Ethertype 406. Furthermore, the network device 102 may communicate the generated one or more Ethernet frames to the adjacent network device 104 based on the OSI layer 2 protocol. Information regarding the utilization of the OSI layer 2 protocol may be received and/or stored during the auto-negotiation process. Moreover, a MAC address of the adjacent network device 104 may be received and/or stored in the MIB 208 during the auto-negotiation. An Ethertype 406 may be set within the generated one or more Ethernet frames 400, for example, to indicate the utilization of the of the OSI layer 2 protocol. The payload 408 of the generated one or more Ethernet frames 400 may be populated with the control information. Furthermore, the payload 408 comprising the control information may be encapsulated in one or more of a non-standardized discovery protocol frame, a standardized discovery protocol frame and/or a link layer discovery protocol data unit. The control information may comprise device capabilities and/or communication parameters. Subsequent Ethernet frames comprising other content may be communicated to the adjacent network device 104 based on the control information.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for associating physical link partners using an OSI layer two mechanism.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in a first of a plurality of network link partners coupled via an Ethernet network link in an Ethernet network:
auto-negotiating with a second network link partner via said Ethernet network link;
during said auto-negotiating, generating one or more tone bursts within a physical layer of said first network link partner, wherein said one or more tone bursts communicates information, said information indicating one or more of:
said first network link partner is operable to communicate based on OSI layer 2 communication;
a MAC address of said first network link partner; and
said first network link partner is operable to exchange device capabilities and/or configuration parameters with said second network link partner based on OSI layer 2 protocol;
transmitting said tone bursts to said second network link partner; and
subsequent to said transmitting said one or more tone bursts, communicating with said second network link partner based on said communicated information, wherein said communicating comprises setting a value of an Ethertype field within an Ethernet frame to indicate that a data unit contained within a payload of said Ethernet frame contains said device capabilities and/or configuration parameters.

2. The method according to claim 1, comprising populating said payload of said Ethernet frame with said device capabilities and/or configuration parameters that are encapsulated based on one or more of a non-standardized discovery protocol, a standardized discovery protocol and/or a link layer discovery packet data unit.

3. A method for networking, the method comprising:
in a first of a plurality of network link partners coupled via an Ethernet network link in an Ethernet network:
during a physical layer 1 auto-negotiation with a second of said plurality of network link partners via said Ethernet network link, transmitting one or more first link code words that each include a plurality of fast link pulse bursts, wherein said one or more first link code words include an indication that said first of said plurality of network link partners is operable to exchange further control information using OSI layer 2 communication;
during said physical layer 1 auto-negotiation, receiving one or more second link code words that each include a plurality of fast link pulse bursts, wherein said one or more second link code words include an indication that said second of said plurality of network link partners is operable to exchange further control information using OSI layer 2 communication; and
subsequent to said physical layer 1 autonegotiation, communicating with said second of said plurality of network link partners based on said OSI layer 2 communication to exchange further control information between said first and second of said plurality of network link partners, wherein said communicating comprises setting a value of an Ethertype field within an Ethernet frame to indicate that a data unit contained within a payload of said Ethernet frame contains said further control information.

4. The method according to claim 3, comprising populating said payload of said Ethernet frame with device capabilities and/or configuration parameters.

5. The method according to claim 4, comprising populating said payload of said Ethernet frame with said device capabilities and/or configuration parameters that are encapsulated based on one or more of a non-standardized discovery protocol, a standardized discovery protocol and/or a link layer discovery packet data unit.

6. A system for networking, the system comprising:
one or more circuits for use in a first of a plurality of network devices coupled via an Ethernet link in an Ethernet network, wherein said one or more circuits are operable to:
during a physical layer 1 auto-negotiation with a second of said plurality of network devices via said Ethernet network link, transmit one or more first link code words that each include a plurality of fast link pulse bursts, wherein said one or more first link code words include an indication that said first of said plurality of network devices is operable to exchange further control information using OSI layer 2 communication;
during said physical layer 1 auto-negotiation, receive one or more second link code words that each include a plurality of fast link pulse bursts, wherein said one or more second link code words include an indication that said second of said plurality of network devices is operable to exchange further control information using OSI layer 2 communication; and
subsequent to said physical layer 1 autonegotiation, communicate with said second of said plurality of network devices based on said OSI layer 2 communication to exchange further control information between said first and second plurality of network devices, wherein said communicating comprises setting a value of an Ethertype field within an Ethernet frame to indicate that a data unit contained within a payload of said Ethernet frame contains said further control information.

7. The system according to claim 6, wherein said first of said plurality of network devices populates said payload of said Ethernet frame with device capabilities and/or configuration parameters.

8. The system according to claim 7, wherein said first of said plurality of network devices encapsulates said device capabilities and/or configuration parameters based on one or more of a non-standardized discovery protocol, a standardized discovery protocol and/or a link layer discovery packet data unit.

* * * * *